United States Patent [19]
Hall

[11] Patent Number: 5,677,399
[45] Date of Patent: Oct. 14, 1997

[54] SYNTHESIS OF MACROCYCLIC POLYMERS WITH GROUP IIA AND IIB METAL CYCLIC ORGANOMETALLIC INITIATORS

[75] Inventor: James E. Hall, Mogadore, Ohio

[73] Assignee: Bridgestone Corporation, Tokyo, Japan

[21] Appl. No.: 743,780

[22] Filed: Nov. 7, 1996

[51] Int. Cl.$^6$ .................... C08F 4/50; C08F 8/48
[52] U.S. Cl. .................. 526/83; 526/82; 526/84; 526/173; 526/175; 526/181; 526/183; 526/190; 525/330.3; 525/330.5; 525/330.6; 525/332.3; 525/342; 525/359.5; 525/359.6; 525/370; 525/371; 525/374; 525/375; 525/379; 525/382; 525/383; 525/386; 525/409; 525/420; 525/474; 525/475; 525/477
[58] Field of Search ...................... 526/183, 190, 526/82, 83, 84, 173, 175; 525/330.3, 330.5, 330.6, 332.3, 342, 359.5, 359.6, 370, 371, 374, 375, 379, 382, 383, 386, 409, 420, 474, 475, 477

[56] References Cited

U.S. PATENT DOCUMENTS

| | | |
|---|---|---|
| 3,351,646 | 11/1967 | Ramsden et al. . |
| 3,354,190 | 11/1967 | Ramsden . |
| 3,388,179 | 6/1968 | Ramsden . |
| 3,726,933 | 4/1973 | Smith et al. ............ 526/183 X |
| 3,766,091 | 10/1973 | Vandenberg ............ 528/413 X |
| 3,822,219 | 7/1974 | Kamienski . |
| 4,116,887 | 9/1978 | Lehn et al. ............ 528/37 X |
| 4,139,490 | 2/1979 | Halasa et al. . |
| 4,410,742 | 10/1983 | Mueller . |
| 4,429,091 | 1/1984 | Hall . |
| 5,066,729 | 11/1991 | Stayer, Jr. et al. . |
| 5,521,309 | 5/1996 | Antkowiak et al. . |

OTHER PUBLICATIONS

Hsieh, H.S. and I.W. Wang. Effects of Dibutylmagnesium on Alkyllithium–Initiated Polymerizations. Macromolecules 1986, 19: 299–304.

Rempp, P., E. Franta, and J.E. Herz. Macromolecular Engineering by Anionic Methods. Advances in Polymer Science 86: 148–149, 159–160. Springer–Verlag, Berlin, Heidelberg, 1988.

Van Beylen, M., et al. Developments in Anionic Polymerization—A Critical Review. Advances in Polymer Science 86: 117–142. Springer–Verlag, Berlin, Heidelberg, 1988.

Fujita, K., et al. Magnesium–Butadiene Addition Compounds: Isolation, Structural Analysis and Chemical Reactivity. J. Organometallic Chemistry, 113(1976): 201–213.

Hild, G., C. Strazielle and P. Rempp. Cyclic Macromolecules. Synthesis and Characterization of Ring–Shaped Polystyrenes. Eur. Polym. J. 19 (8): 721–727, 1983.

Hild, G., A. Kohler and P. Rempp. Synthesis of Ring–Shaped Macromolecules. Eur. Polym. J. 16: 525–527, 1980.

Schober, B.J., et al. New Delocalized Tetraanion Initiators For Polymeric Catenane Synthesis. Polymer Preprints 30(2): 199–200.

Geiser, D. and H. Höcker. Synthesis and Investigation of Macrocyclic Polystyrene. Macromolecules 1980, 13: 653–656.

Yasuda, H. et al. Magnesium–Assisted Stereospecific Oligomerization of Isoprene. Unique Chemical Behaviors of Magnesium–Isoprene Adducts, $[Mg(C_5H_8)_m]_n$. Macromolecules 11(3): 586–592, 1978.

Roovers, J. and P.M. Toporowski. Synthesis of High Molecular Weight Ring Polystyrenes. Macromolecules 1983, 16: 843–849.

Gruter, G–J. M., et al. Formation of the First Organometallic Catenane. J. Am. Chem. Soc. 1993, 115: 12179–12180.

Bickelhaupt, F. Organomagnesium Chemistry: Nearly Hundred Years But Still Fascinating. J. Organometallic Chem 475 (1994): 1–14.

*Primary Examiner*—Fred Teskin
*Attorney, Agent, or Firm*—Daniel N. Hall

[57] ABSTRACT

The invention is a practical process for anionically synthesizing commercially significant quantities of macrocyclic polymers from polar and/or non-polar monomers by using Group IIA and IIB metal cyclic organometallic initiators. Activation of the ring metal atom results in anionic polymerization of the monomers by addition into the initiator ring at the bonds between the atom and its two adjacent carbon atoms, the metal atom acting as a bridge between the two living ends of the propagating chain. Coupling of the cyclic polymer living ends by coupling agents produces macrocyclic polymers that are stable in air and moisture and that exhibit desirable properties, such as low viscosities at high molecular weights. Such macrocyclic polymers provide enhanced polymer processability during molding, extruding and the forming of films. Macrocyclic polymers terminated with coupling agents that also provide functional groups may be compounded to produce vulcanizable elastomeric compounds and articles that exhibit reduced hysteresis properties.

14 Claims, 6 Drawing Sheets

SYNTHESIS OF MACROCYCLIC POLYMERS WITH GROUP IIA AND IIB METAL CYCLIC ORGANOMETALLIC INITIATORS

BACKGROUND OF THE INVENTION

The subject invention relates to a practical process of anionic synthesis of commercially significant quantities of macrocyclic polymers using cyclic organometallic polymerization initiators containing metals of Group IIA and IIB of the Periodic System. More particularly, the invention relates to anionic polymerization of polar or non-polar monomers to form stable macrocyclic polymers that exhibit desirable properties, such as low viscosities at high molecular weights, and thus provide for enhanced polymer processability during molding, extruding and the forming of films. Moreover, the macrocyclic polymers synthesized by the process of the invention may be compounded to form vulcanizable elastomeric compounds and articles that exhibit reduced hysteresis properties.

Several previous attempts to synthesize ring-shaped macromolecules, such as macrocyclic polystyrene, have employed anionic polymerization techniques using, as initiators, metal organic complexes of metals of Group I of the Periodic System, such a dilithio, disodium or dipotassium compounds. In these systems, the polymer ring is formed from a linear polymer, in the presence of hydrocarbon solvents, such as benzene and/or tetrahydrofuran (THF), by coupling together of the two living ends with a bifunctional terminating agent, such as $\alpha,\alpha'$-dichloro- or $\alpha,\alpha'$-dibromo-p-xylene. However, in order to favor the probability of intramolecular coupling rather than intermolecular coupling, the reaction must take place at high dilution, the concentration of reactants being as low as possible, and the resulting yield of macrocyclic polymers is extremely low. Thus, these methods are not practical for producing the quantities of macrocyclic polymers necessary for commercial applications.

In another approach, barium and strontium metals have been reported to initiate synthesis of styrene oligomers to produce barium and strontium salts of polystyrene with two active end-groups per chain and intermediate ring structures. However, no suggestion or attempt was made to produce stable polymers having a ring structure.

Organomagnesium compounds, by themselves, are generally known to be ineffective catalysts for anionic polymerization of 1,3-dienes and vinyl aromatic monomers. However, dialkylmagnesium reagents, or other dialkylmetallic complexes of Group II metals, can participate in anionic polymerization when complexed with alkyl lithium compounds, or with alkylmetallic complexes of other Group I metals, to produce linear polymers or copolymers of predictable molecular weight. A practical method for producing significant quantities of stable macrocyclic polymers utilizing such reagents, however, has not been described.

Certain low molecular weight organomagnesium adducts, known to be useful in a manner similar to Grignard reagents, can be prepared by the reaction of activated magnesium metal or magnesium hydride with styrene, substituted styrenes, conjugated diolefins, such as butadiene, isoprene and myrcene, or certain aromatic hydrocarbons, such as anthracene and naphthalene, in the presence of a saturated cyclic ether, such as THF. In addition, magnesium-butadiene adducts in the ratios of 1:1, 1:2, 1:3 and 1:4 have been obtained by reacting metallic magnesium and butadiene in THF in the presence of a catalytic amount of an organic halide. However, polybutadiene could not be obtained in this system because magnesium-butadiene adducts of ratios greater than 1:5 resulted in inactivation of the living ends due to ring closure.

Magnesium-isoprene adducts have also been synthesized by reacting isoprene with magnesium metal activated with minute quantities of iodine, alkyl halides and/or metal halides in the presence of a solvent, such as THF. The adducts behaved as Grignard reagents and were reactive with air and moisture. Isolation of the unstable adducts was achieved by quenching with a protic agent, such as water or alcohol. The adducts were shown to be, before quenching, low molecular weight macrocyclic structures containing 1 to 5 magnesium atoms in the ring, and had catalytic activity in the oligomerization of isoprene to form non-cyclic, linear 3,4-polyisoprene. The formation of this linear oligomer, however, was dependent on the amount of isoprene in the mixture and was in competition with the formation of cyclic compounds which had no further activity because, as with the magnesium-butadiene adducts described above, ring closure resulted in termination of the oligomerization reaction.

Until the present invention, therefore, there has not been described a practical and economical method for anionic synthesis of stable macrocyclic polymers in commercially significant quantities, let alone macrocyclic polymers that have useful and improved properties in comparison with linear polymers, such as lower viscosities at equivalent molecular weights. Further, there has not been described a practical method for cyclic anionic polymerization of both polar and non-polar monomers to form a wide variety of macrocyclic polymer products.

SUMMARY OF THE INVENTION

The present invention provides a practical and economical process for synthesizing commercially significant quantities of macrocyclic polymers, comprising polar or non-polar monomers, by utilizing Group IIA and IIB metal cyclic organometallic compounds as initiators for anionic polymerization. Processes utilizing these initiators for anionic synthesis of macrocyclic multiblock polymers and macrocyclic polymers having low hysteresis properties are disclosed in our commonly assigned applications, U.S. Ser. Nos. 08/743,783 and 08/743,779, entitled "Synthesis of Multiblock Polymers Using Cycloorganometallic Initiators" (Attorney Docket No. 9512073) and "Synthesis of Macrocyclic Polymers Having Low Hysteresis Compounded-Properties" (Attorney Docket No. 9512071), filed on the same date as this application, the disclosures of which are hereby incorporated by reference.

According to the present invention, the two living ends of the unstable macrocyclic polymers formed by the anionic polymerization process are coupled with a coupling agent, that may also be a functionalizing agent, to form macrocyclic polymers that are stable in air and moisture. In the context of this invention, a functionalizing agent is one that interacts with the metal-bound polymer and simultaneously covalently closes the ring and provides a functional group capable of reacting with a filler.

In comparison with linear polymers, the stable macrocyclic polymers synthesized by the process of the present invention exhibit desirable properties, such as lower viscosities at equivalent molecular weights. Thus, manageable compound viscosities may be obtained whether high molecular weight or low molecular weight macrocyclic polymers are used during polymer compounding processes.

The macrocyclic polymers also provide enhanced polymer processability during molding, extruding and the forming of films and may also be compounded to form vulcanizable elastomeric compounds and articles that exhibit reduced hysteresis properties. Such elastomers, when compounded to form articles, such as tires, power belts, shock absorbers, mounts and the like, will show an increase in rebound, a decrease in rolling resistance and have less heat build-up when mechanical stresses are applied.

The Group IIA and IIB metal cyclic organometallic initiators utilized in the process of the invention are prepared by known methods, typically employing Grignard reagents, in the presence of a polar, aprotic solvent under anhydrous, anaerobic conditions. The initiators comprise low molecular weight ring-shaped adducts of a divalent metal with a reactant, or heterogeneous mixture of reactants, and contain one or more metal atoms (Mt) and one or more reactant units (Rct) in the ring structure, according to the formula where m and n each independently represent at least one.

The reactant (Rct) may comprise any reactant that combines chemically with the metal atom to form a ring-shaped initiator, such reactants including, but not limited to, aliphatic olefins, styrene, substituted styrenes, cyclic or acyclic conjugated diolefins, including butadiene, isoprene, myrcene, α-phellandrene, and the like, or aromatic hydrocarbons, such as anthracene and naphthalene. Certain dihalo organic compounds can react via Schlenk-type equilibria to produce cyclic organometallic initiators useful in the invention. The metal employed in the initiator is selected from the Group IIA and IIB metals consisting of beryllium, calcium, barium, strontium, magnesium, cadmium, zinc and mercury. Preferably, the metal is magnesium and the initiator comprises a cyclic organomagnesium compound.

According to the invention, macrocyclic polymers are prepared from the cyclic organometallic initiators by incorporation of polar or non-polar monomers into the initiator ring at two living "ends" that are bridged by each divalent metal atom. In order for anionic polymerization of non-polar monomers to occur, the divalent metal atom must be activated by known methods, such as by the use of polar solvents or polar coordinators, or by complexing with a Group IA metal alkyl or alkoxy compound, such as a metallic organic compound comprising a metal selected from the group consisting of lithium, sodium, potassium, rubidium, cesium and mixtures of these. In anionic polymerization of polar monomers, the polar monomers themselves serve as activators for the Group IIA and IIB metal atom. As monomers are continually incorporated into the ring, the terminal carbons of the two living ends remain in close proximity to each other due to the bridging metal atom which is carried at each propagating living end of the growing polymer ring.

When polymerization is complete, a coupling agent, that may also be a functionalizing agent, is added to the mixture to terminate the reaction and couple together the living ends of the propagating cyclic polymer chain at the carbon-metal moieties, thus producing macrocyclic polymers that are stable in air and moisture and which may also contain functional groups to improve compounding properties. The macrocyclic polymers do not exhibit uncoupled chain ends. However, it is recognized that, in some instances, the coupling process may produce a mixture of macrocyclic and linear polymers. It was discovered that, when compounded, the mixture of macrocyclic and linear polymers produced by the method of the invention result in products exhibiting improved physical properties, as described above.

In addition to coupling together the living ends of a single ring, the coupling agent may couple together the living ends of adjacent rings, forming macrocyclic polymer rings incorporating a plurality of single rings. In some cases, a coupling agent may couple together living ends of more than one ring, forming intermolecular coupled polymers. By similar processes, intertwining polymer chains or catenanes may be formed. A tetra-reactive coupling agent may produce a figure eight double ring. Thus, both intramolecular and intermolecular coupling are favored by the process of the invention and, in contrast to the prior art, the macrocyclic polymers may be produced with high concentrations of polar or non-polar monomers to result in quantities of macrocyclic polymers suitable for commercial applications to form a wide variety of polymer products.

DETAILED DESCRIPTION OF THE INVENTION

The subject invention provides a novel process for synthesizing commercially significant quantities of stable macrocyclic polymers by employing Group IIA and IIB metal cyclic organometallic compounds as initiators of anionic polymerization of monomers and terminating the polymerization with a coupling agent, that may also be a functionalizing agent. The Group IIA and IIB cyclic organometallic initiators may be employed with any anionically polymerizable monomer to yield polymeric products.

Polar monomers suitable for polymerization by the process of the invention include, but are not limited to, alkyl methacrylates having from about 5 to about 25 carbon atoms, acrylonitriles, ethylene oxide, propylene oxide, lactams, cyclosiloxanes, alkyl acrylates having from about 4 to about 25 carbon atoms, vinyl pyridine, and mixtures and copolymers of these. Macrocyclic polymers formed by anionic polymerization of polar monomers include, but are not limited to, polyethylene oxide, polyvinylpyridine, polyacrylate, polymethacrylate, polymethylmethacrylate, polyacrylonitrile, polylactam, polyvinyl pyridine, and mixtures and copolymers of these.

Non-polar monomers suitable for polymerization by the process of the invention include, but are not limited to, hydrocarbons, such as ethylene; conjugated alkadienes having from about 4 to about 40 carbon atoms, preferably $C_4$–$C_{12}$ alkadienes, including butadiene, isoprene, and the like; aryl alkenes having from about 8 to about 20 carbon atoms, such as styrene and $C_1$–$C_7$ alkyl or alkoxy substituted styrenes; vinyl polynuclear aromatics, such as vinyl anthracene and vinyl naphthalene and their $C_1$–$C_7$ alkyl and alkoxy substituted analogs; $C_6$–$C_{18}$ trienes; and mixtures of these. Macrocyclic polymers formed by anionic polymerization of non-polar monomers include, but are not limited to, polyethylene, polybutadiene, polyisoprene, polystyrene, poly-α-methyl styrene, polyvinylanthracene, polyvinylnaphthalene, and mixtures and copolymers of these, such as styrene butadiene rubber (SBR).

The macrocyclic copolymers formed by the process of the invention may comprise from about 99 to 10 percent by weight of monomer A units and from about 1 to about 90 percent by weight of monomer B units. The copolymers may be random copolymers or block copolymers. Random copolymers result from simultaneous copolymerization of the monomers A and B with randomizing agents. Block copolymers, poly(b-B-b-A-b-B), result from the separate polymerization of the monomers forming the A and B polymers. The block copolymer, poly(b-styrene-b-butadiene-b-styrene) is referred to as an S-B-S triblock polymer. Such block copolymers are the subject of a commonly assigned application filed on the same date as this application, U.S. Ser. No. 08/743,783 (Attorney Docket No. 9512073).

The cyclic organometallic initiators for use in the invention are prepared according to known methods, under anhydrous, anaerobic conditions, by reacting "m" divalent metal, Mt, in the form of elemental metal or a reactive compound, such as a hydride, with "n" reactants (Rct), where m and n each independently represent at least one, according to the formula (Initiator)

The metal can be in the form of elemental metal, either pure or alloyed with another, nonreactive metal, or in the form of a reactive compound, such as a metal hydride. Typically, pure metal is used. As is known with the formation of Grignard reagents, the metal may be activated by scraping, ultrasound or the addition of small amounts of activators, such as alkyl halides, metal alkyl halides or halogens, such as iodine.

The reactant, Rct, can be olefinic, such as alkene or alkadiene (e.g., a $C_2$–$C_{12}$ alkene or $C_4$–$C_{40}$ alkadiene), or alkylene, such as styrene or styrene analogs (e.g., a $C_8$–$C_{28}$ aralkene), polynuclear aromatic, or a dihaloorganic compound, such as an alpha, omega dihalo $C_4$–$C_8$ alkane or a di(halomethyl) substituted aromatic, such as 1,2-di(chloromethyl) benzene or 1,8-di(bromomethyl) naphthalene.

The initiator ring incorporates at least one metal atom and at least one Rct unit and generally contains at least 3, and usually a total of 5 to 50, ring member atoms. Typically, the larger number of ring atoms (e.g., greater than 12) result when there is more than one metal atom and more than one Rct unit in the ring (i.e., n and m>1). When n=m=1, the initiator ring usually has 5 to 8 ring atoms and typically 5 to 7 ring atoms.

The cyclic organometallic initiator thus synthesized is employed to initiate polymerization, under anhydrous, anaerobic conditions, of at least one anionically polymerizable polar or non-polar monomer, Mono, to form a macrocyclic polymer, as illustrated below, containing "x" monomers (Mono)x, where each x represents a degree of polymerization of one or more. Polymerization of non-polar monomers requires the presence of an activator, as discussed further below.

The macrocyclic polymers thus produced are highly unstable in air and moisture. By the process of the invention, however, it was unexpectedly discovered that stable macrocyclic polymers can be obtained if polymerization is terminated with a coupling agent (Cp) that covalently closes the ring structure, as schematically illustrated below. Not only are the obtained macrocyclic polymers stable in air and moisture, but they have desirable properties and are obtainable in quantities that are useful in commercial applications. The reaction with a coupling agent may result in the metal atom remaining in the polymer ring. Alternatively, the metal atom may be removed from the ring by the reaction.

Coupled Macrocyclic Polymer

Although termination with the coupling agent results in a high level of polymer coupling to form macrocyclic polymers, the reaction also produces linear polymers, resulting in a mixture of macrocyclic and linear polymers.

Figure 1:
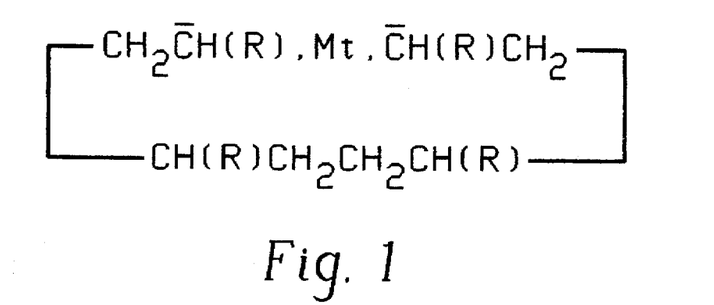
FIG. 1 is a representation of a typical Group IIA or IIB metal cyclic organometallic initiator employed for anionic polymerization in the process of the invention to produce macrocyclic polymers.

A typical cyclic organometallic initiator for use in the invention is illustrated in FIG. 1 and comprises a divalent metal atom Mt complexed to the carbons (C) of one or more reactant units contained in a ring, wherein the metal atom is selected from the group consisting of beryllium, calcium, barium, strontium, magnesium, cadmium, zinc and mercury. While a variety of Group II metals, as disclosed above, can be used to form the cyclic initiators of this invention, magnesium is preferred because of its reactivity and availability. Therefore in the following, for convenience, magnesium will be discussed with the understanding that the other metals disclosed can also be used with it or in its place, without departing from the invention. The cyclic organometallic initiators utilized in the invention are prepared by known methods, typically employing Grignard reagents, in the presence of a polar, aprotic solvent under anhydrous, anaerobic conditions. For example, methods for preparing barium or strontium polystyrene rings in this manner are known.

Figure 2:
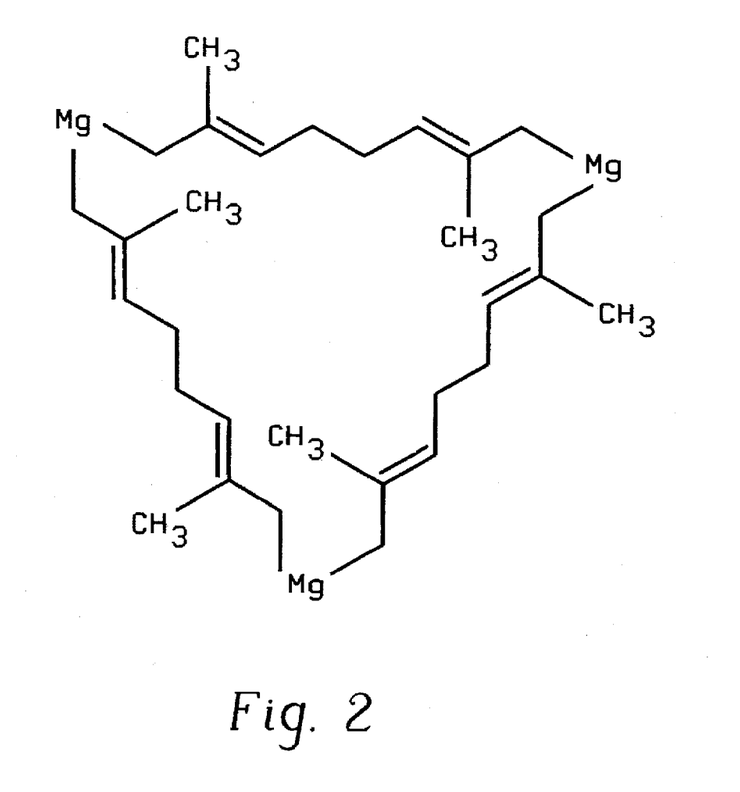
FIG. 2 is a representation of a typical cyclic organomagnesium initiator that may be employed in an embodiment of the anionic polymerization process of the invention to produce macrocyclic polymers.

In a preferred embodiment of the invention, the cyclic organometallic initiator comprises a cyclic organomagnesium compound. Cyclic low molecular weight adducts containing magnesium may be obtained by reacting activated magnesium metal or magnesium hydride, in the presence of a solvent, such as benzene or tetrahydrofuran (THF), with reactant such as those described above. Suitable reactant hydrocarbon compounds and reaction conditions for use in preparing the magnesium-containing adducts used in this invention are disclosed in U.S. Pat. Nos. 3,388,179, 3,354,190 and 3,351,646, the portions of which pertaining to such reactant hydrocarbon compounds and reaction conditions are hereby incorporated by reference. Other suitable synthesis methods may also be employed to prepare cyclic organomagnesium or other cyclic organometallic initiators. For example, certain dihalo organic compounds can function as the reactant, Rct, and will react with magnesium via the Schlenk equilibrium to produce magnesium dihalide and a cyclic organomagnesium product suitable for use as an initiator of the invention. Among these are the $C_4$–$C_8$ alpha, omega alkanes and di(halomethyl) substituted aromatics described above.

The resulting adducts may contain one or more (typically one to six) magnesium atoms and from one to about 25 reactant units per magnesium atom in the ring structure. The rings contain a total of from 3 to about 50 ring atoms, including both the metal and reactant unit ring atoms. Some known ring structures containing, on average, 25 members have been reported to contain five magnesium atoms; rings containing 27 members, three magnesium atoms; and larger ring structures, one magnesium atom. A typical initiator suitable for use in the process of the invention is a magnesium-isoprene adduct, illustrated in FIG. 2, containing six isoprene units (a total of 24 ring carbon atoms) and three magnesium atoms in the ring, which results in a total of 27 ring atoms. However, larger or smaller cyclic organometallic compounds, containing more or fewer divalent metal atoms are also suitable as initiators in the process of the invention.

Figure 4:
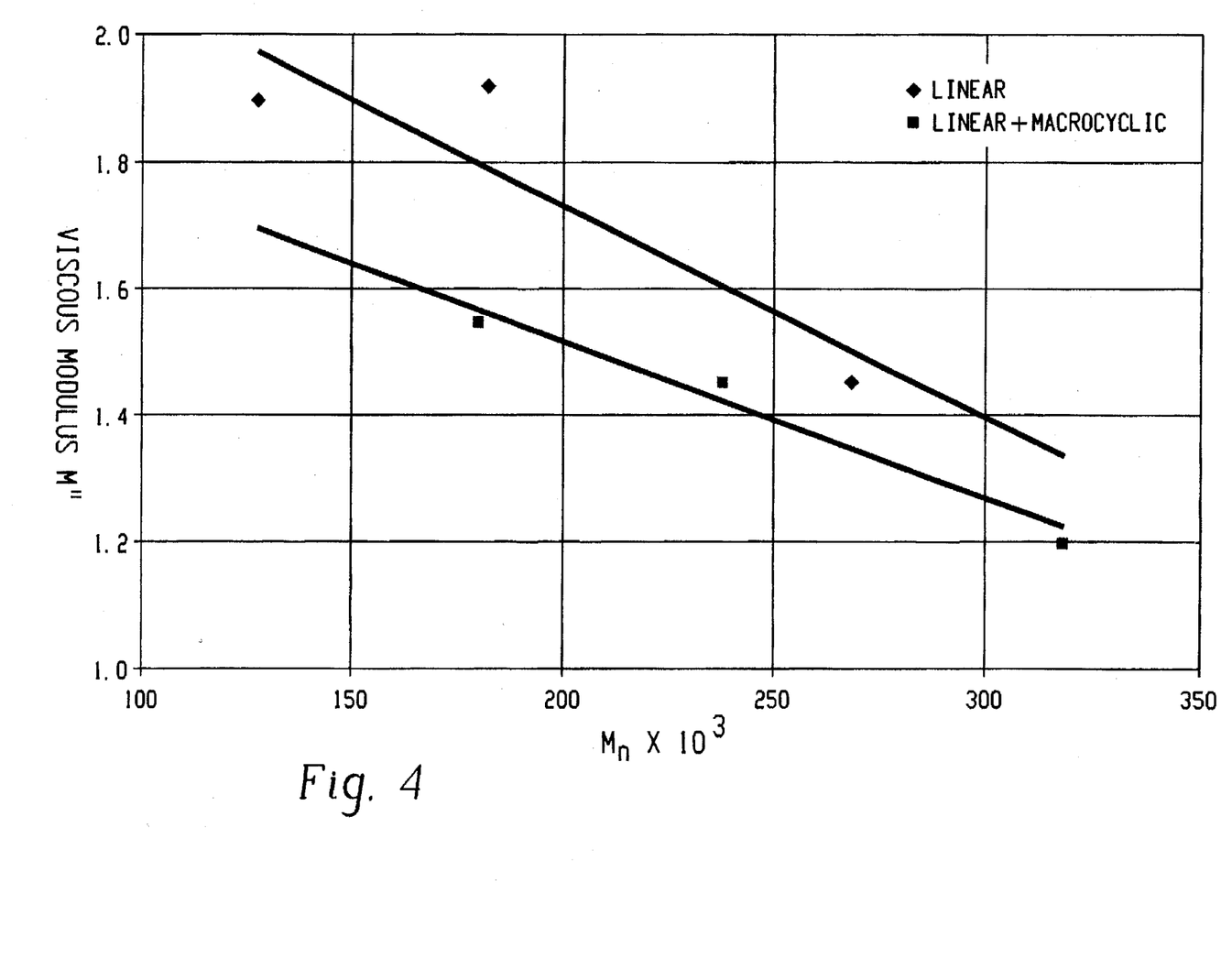
FIG. 4 is a graphic illustration that compares the number average molecular weight ($M_n$) versus the viscous modulus (M") of cured compounds containing coupled (linear+macrocyclic) and non-coupled (linear) polymers.
Figure 5:
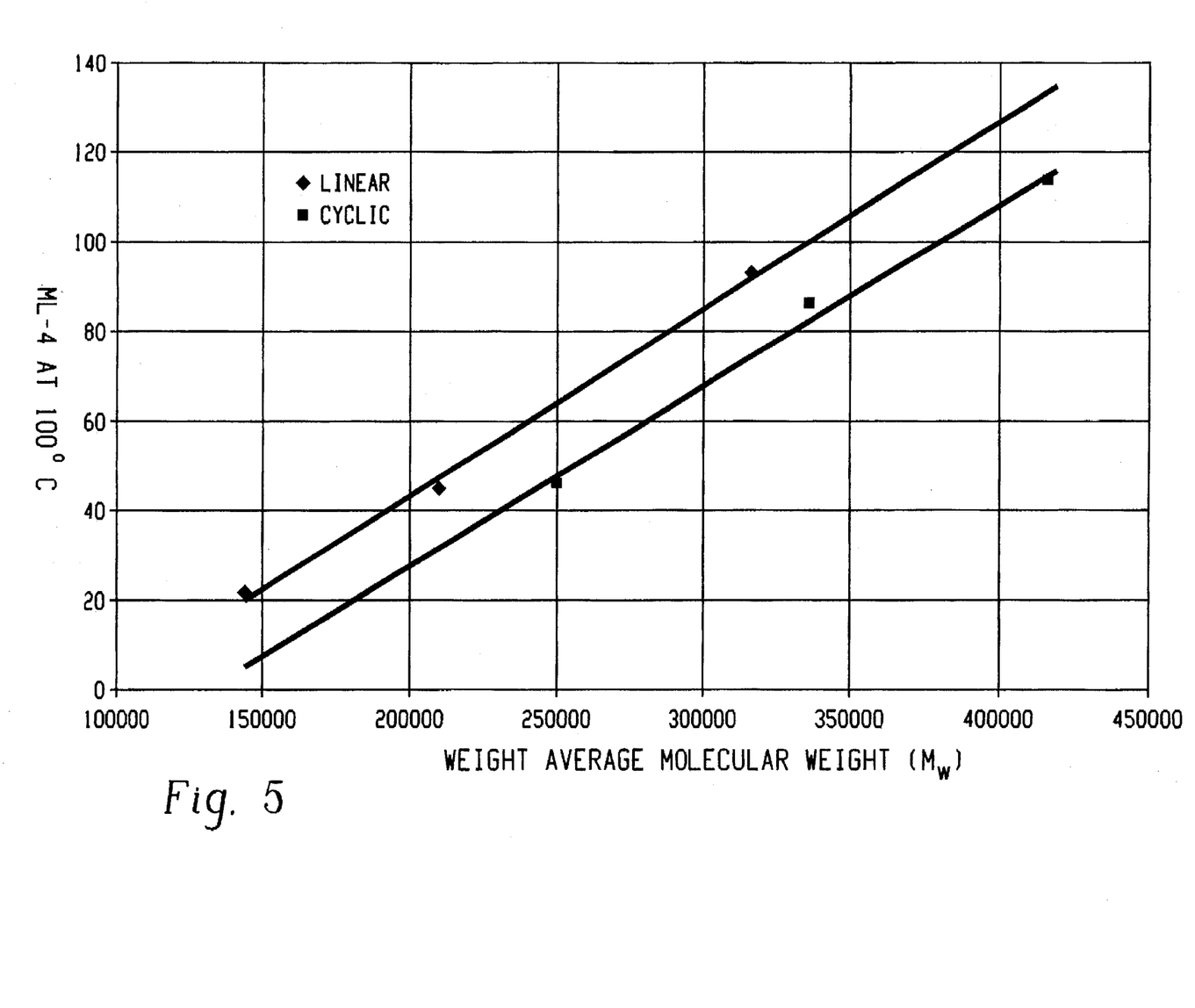
FIG. 5 is a graphic illustration that compares the weight average molecular weight ($M_w$) versus the compound Mooney (ML-4 @ 100° C.) of coupled (linear+macrocyclic) and non-coupled (linear) polymers.

According to the process of the invention, a macrocyclic polymer is prepared by reacting at least one anionically polymerizable monomer with the cyclic organometallic initiator, preferably in the presence of an anhydrous, aprotic solvent. As described further below, activation of a metal atom in the initiator ring results in anionic polymerization of the monomers by addition (or insertion) of a monomer molecule into the initiator ring at the bonds between the metal atom and its two adjacent carbon atoms. Thus, the metal atom acts as a bridge between the two "living ends" of the growing cyclic polymer ring and, as monomers are continually incorporated into the ring, the terminal carbons of the two living ends of the growing polymer remain in close proximity to each other. As is known in the art, the amount of initiator used in the polymerization is chosen so as to yield the desired polymer molecular weight. Typically, one part by equivalent of initiator is used to about 20 to 20,000 parts by equivalent of monomer, although high ratios, such as 1:30,000, 1:40,000, 1:50,000 or more can be used. The molecular weights of the polymers and degree of polymerization are illustrated in FIGS. 4 and 5.

When polymerization is complete, a coupling agent, which may also be a functionalizing agent, is added to the mixture to terminate the reaction and to couple together the living ends of the polymer ring, thus producing macrocyclic polymers that are stable in air and moisture.

Figure 3:
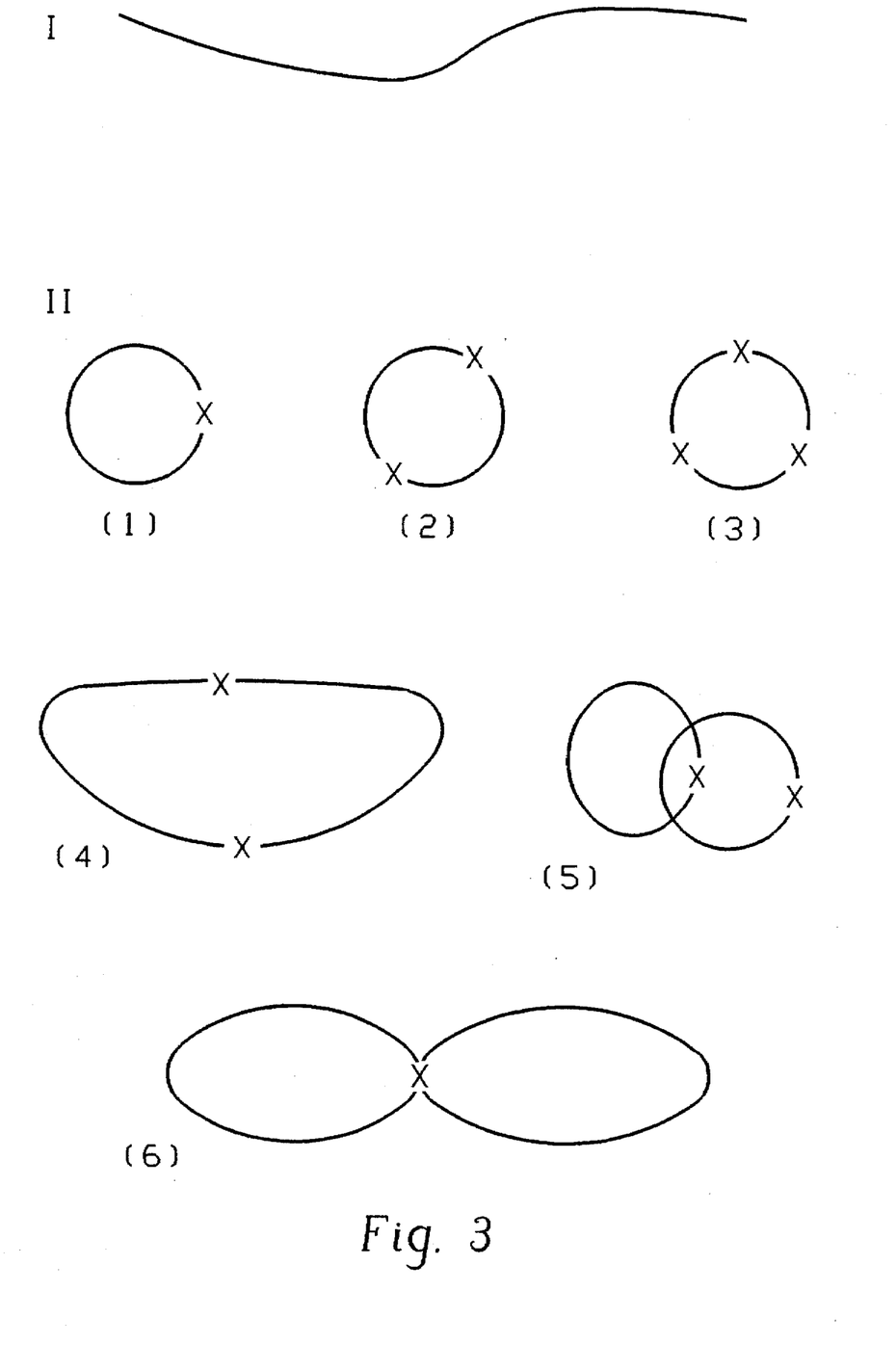
FIG. 3 is a schematic representation of the mixture of linear and macrocyclic polymers that may be obtained when prepared by the process of the invention when polymerization is terminated with a coupling agent "X".

As illustrated in FIG. 3, the polymers produced by the process of the invention are believed to be a mixture of linear polymers (I) and macrocyclic polymers (II) of varying sizes. The resulting ratio of macrocyclic polymers to linear polymers is also variable and dependent on several factors, such as the concentration of monomers, the nature of the Group IA metal organic activator or other activator (see below) and the general reaction conditions, such as temperature and efficiency of the coupling reaction. The size and properties of the macrocyclic polymers formed by the process of the invention also vary according to the nature and concentration of the monomers, the ratio of the monomer to the initiator, the polymerization time, as well as the nature and reactivity of the coupling agent (X). Single ring polymers (1) of varying sizes may be produced by intramolecular coupling of the living ends. In addition, the presence of more than one divalent metal atom in the ring and, therefore, the presence of more than one site for propagation of the polymer chain, may result in single rings that are, for example, double-sized (2) or triple-sized (3). In addition, the coupling agent may couple together living ends of more than one ring, resulting in intermolecular (4) coupling. Moreover, by a similar process, intertwining polymer chains (5), or catenanes, may be formed. A tetrafunctional coupling agent may produce a figure eight double ring (6).

If non-polar monomers are to be polymerized by the process of the invention, the reaction preferably further requires the presence of an activator which forms a complex with the metal atom on the ring to activate the metal atom and allow polymerization to occur. The activator may comprise a Group IA metal organic compound which, preferably, is one that does not promote linear polymerization. For example, a lithium alkoxide compound which does not promote linear polymerization is preferred over an alkyllithium compound known to promote linear polymerization. Preferably, the activator comprises a Group I metal $C_1$–$C_{12}$ alkoxide or $C_1$–$C_{12}$ alkyl thiolate, such as lithium-t-butoxide or sodium amylthiolate. Other alkali metal organic compounds, such as lithium amides, and potassium, sodium and lithium phosphides, may also be employed as activators. The activation reaction between organometallic compounds of Group I and Group IIA of the Periodic System are disclosed in U.S. Pat. No. 3,822,219, the disclosure of which is hereby incorporated by reference. Polar solvents or polar coordinators, known to one skilled in the art, may also be employed to promote activation of the initiator Group IIA and IIB metal atom. In anionic polymerization of polar monomers, the polar monomers themselves serve as activators for the Group IIA and IIB metal atom.

Polymerization is usually conducted in a conventional solvent for anionic polymerizations, such as hexane, cyclohexane, benzene and the like. Various techniques for polymerization, such as batch, semi-batch and continuous polymerization may be employed. In order to promote randomization in copolymerization and to increase vinyl content, in the case of elastomeric copolymers, a polar coordinator may optionally be added to the polymerization ingredients. Amounts of the polar coordinator range between about 0.1 to about 90 or more equivalents per equivalent of magnesium. The amount depends upon the type of polar coordinator that is employed, the amount of vinyl content or randomization desired, the level of co-monomer employed and the temperature of the polymerization reaction, as well as the selected initiator.

Compounds useful as polar coordinators are organic and include, but are not limited to, tetrahydrofuran, linear and cyclic oligomeric oxolanyl alkanes such as 2-2'-di (tetrahydrofuryl) propane, di-piperidyl ethane, dimethyl ether, diazabicyclooctane, hexamethylphosphoramide, N-N'-dimethylpiperazine, diethyl ether, tributylamine and the like. The linear and cyclic oligomeric oxolanyl alkane polar coordinators are described in U.S. Pat. No. 4,429,091, the subject matter of which regarding polar solvents is incorporated herein by reference. Other compounds useful as polar coordinators include those having an oxygen or nitrogen heteroatom and a non-bonded pair of electrons. Examples include dialkyl ethers of mono and oligo alkylene glycols; "crown" ethers; and tertiary diamines, such as tetramethylethylene diamine (TMEDA).

According to the process of the invention, polymerization is begun by charging a blend of the monomer(s) and solvent to a suitable reaction vessel, followed by the addition of a Group IA metal organic compound or other activating agent (if necessary) and the cyclic organometallic initiator. As with the preparation of the initiator, the polymerization reaction is carried out under anhydrous, anaerobic conditions. Often, it is conducted under a dry, inert gas atmosphere. The polymerization can be carried out at any convenient temperature, such as about −30° C. to about 200° C. For batch polymerizations, it is preferred to maintain the peak temperature at from about 49° C. to about 149° C., and more preferably from about 80° C. to about 120° C. Polymerization is allowed to continue under agitation for about 0.15 to 24 hours.

After polymerization is complete, the resulting polymer is terminated by a quenching agent that comprises a coupling agent or a coupling agent that is also a functionalizing agent, to obtain a macrocyclic polymer. To obtain linear polymers for comparison of properties with the macrocyclic polymers of the invention, the polymerization reaction may be terminated with a protic quenching agent, such as water, steam or an alcohol, such as isopropanol, that does not couple the living ends of the macrocyclic polymer but produces a linear polymer. The terminating agent is added to the reaction vessel, and the vessel is agitated for about 0.1 to about 4.0 hours. Quenching is usually conducted by stirring the polymer and quenching agent for about 0.25 hours to about 1.0 hour at temperatures of from about 30° C. to about 120° C. to ensure a complete reaction.

Lastly, the solvent is removed from the polymer by conventional techniques. These include steam or alcohol coagulation, thermal desolventization, or any other suitable method. Additionally, solvent may be removed by drum drying, extruder drying, vacuum drying or the like. Desolventization by drum-drying, coagulation in alcohol, steam or hot water desolventization, extruder drying, vacuum drying, spray drying, and combinations thereof are preferred. An antioxidant, such as butylated hydroxy toluene (BHT) and/ or an antiozonant compound is usually added to the polymer or polymer cement at or before this stage to prevent degradation of the polymer.

As discussed above, termination of the polymerization reaction with a coupling agent serves to couple the living ends of the polymer rings together to form intramolecular or intermolecular polymer rings that are stable in air and moisture. Thus, the resulting macrocyclic polymers do not exhibit uncoupled chain ends which are known to increase hysteresis.

Furthermore, coupling agents that are also functionalizing agents may be employed as quenching agents. These agents are compounds that, in addition to coupling together the chain ends, also provide a functional group. After quenching, the polymers still retain the functional group on the polymer ring. The use of a functionalizing agent also serves to endcap any linear polymers present in the polymer mixture with a functional group, as described below. Any compounds providing terminal functionality (e.g., "endcapping") of the linear polymers and that are reactive with the macrocyclic polymer bound carbon-metal moieties can be selected to provide a desired functional group.

Exemplary coupling agents are ortho-dichloro-xylene (ODX), di($C_1$–$C_8$ alkyl) silicon dichloride, $C_1$–$C_8$ alkyl benzoate, silicon tetrachloride, esters, diesters, triesters, dihalo organics, hexachloroxylene, and mixtures of these.

Typical polymerization termination reactions utilizing a coupling reagent are illustrated below. Termination with ODX (1) results in a macrocyclic polymer containing a benzene ring. Termination with dimethylamino benzaldehyde (DMAB) (2) results in a macrocyclic polymer having at least two dimethylaminobenzyl functional groups. In the case of DMAB termination, the metal atom (in this embodiment, magnesium) remains as a ring constituent.

Functionalizing agents are particularly preferred when elastomers are polymerized by the process of the invention because the functional group promotes uniform and homogeneous mixing with fillers, such as silica and carbon black. Therefore, for example, compounding of vulcanizable macrocyclic elastomers, prepared by the process of the invention, results in rubber products exhibiting improved physical properties, such as reduced hysteresis, which means a rubber product having increased rebound, decreased rolling resistance in tires, and lessened heat build-up when subjected to mechanical stress.

Examples of suitable functionalizing agents are substituted aldimines, substituted ketimines, 4,4'-bis (dimethylamino)-benzophenone, 1,3-dimethyl-2-imidazolidinone, 1-alkyl substituted pyrrolidinones, 1-aryl substituted pyrrolidinones, dimethylamino benzaldehyde, tin tetrachloride, di($C_1$–$C_8$ alkyl) tin dichloride, carbon dioxide, and mixtures of these. Further examples of reactive compounds include the terminators described in U.S. Pat. No. 5,066,729 and U.S. Pat. No. 5,521,309, the subject matter of which, pertaining to terminating agents and terminating reactions, is hereby incorporated by reference. The practice of the present invention is not limited solely to these terminators, since other compounds that are reactive with the polymer bound carbon-metal moieties can be selected to provide a desired functional group.

Usually the macrocyclic polymers of this invention have molecular weights ranging from 2,000 to 1,000,000 or even 1.5–3.0×$10^6$. Typically they have molecular weights of 30,000 to 600,000 as measured by conventional gel permeation chromatographic (GPC) techniques.

As stated above, it has been found that commercially significant quantities of macrocyclic polymers can be produced by the process of the present invention from both polar and non-polar monomers that are anionically polymerizable. In comparison with linear polymers, the macrocyclic polymers produced according to the invention exhibit desirable properties, such as lower viscosities at equivalent molecular weights. Thus, high or low molecular weight macrocyclic polymers may be used during polymer compounding processes and manageable compound viscosities are still obtained, resulting in enhanced polymer processability during mixing, molding, extruding and the forming of films. The macrocyclic polymers synthesized by the process of the invention may also be compounded to form vulcanizable elastomeric compounds and articles that exhibit reduced hysteresis properties. Articles, such as tires, shock absorbers, mounts, power belts and the like, will show an increase in rebound, a decrease in rolling resistance and have less heat build-up when mechanical stresses are applied, resulting in improved fuel economy.

EXAMPLES AND GENERAL EXPERIMENTAL PROCEDURE

In order to demonstrate the preparation and properties of macrocyclic polymers prepared according to the present invention, two cyclic organomagnesium initiators were prepared by known methods, as described above. The initiators were then used to polymerize either a solution of butadiene monomers or a solution of butadiene and styrene monomers. A comparison was made of properties of the resulting polymers or elastomers when polymerization was terminated with a protic terminating agent (isopropanol), a coupling agent (dimethyl silicon dichloride), or a coupling/functionalizing agent (dibutyl tin dichloride).

The described initiators and coupling agents are intended to be only examples of initiators and coupling agents that may be used in the process of the invention, and their particular use is not intended to be limiting, as other cyclic organometallic compounds and coupling agents may be utilized by those skilled in the art.

CYCLIC ORGANOMAGNESIUM INITIATOR PREPARATION

The following isoprene-magnesium and styrene-butadiene-magnesium initiators were prepared in 28-ounce and 10-ounce beverage bottles, respectively. The bottles were dried by baking for at least 24 hours at 115° C. and then capped with crown, two-hole caps and rubber liners. The bottles were cooled while purging with dry nitrogen.

1. Isoprene-Magnesium Initiator (IMG)

In order to prepare the IMG initiator, 10 grams of 50-mesh magnesium metal shavings were activated by 2 millimoles (mM) of butyl magnesium chloride in tetrahydrofuran (THF), in the presence of 115 grams of isoprene and a further 231 grams of anhydrous THF. The reaction mixture was heated to 80° C. in a rotating water bath. Oligomerization of the isoprene was allowed to occur for 18 hours at which time all of the magnesium was reacted. The initiator had a greenish color in THF.

The total magnesium concentration was determined by acid titration of the hydrolyzed initiator. The activity of the IMG for polymerization was determined by polymerizing 1,3-butadiene in hexane at three concentrations of added IMG in the presence of lithium-t-butoxide. Linear least squares analysis of molecular weight data and correction for impurities allows calculation of the concentration of active IMG.

2. Styrene-Butadiene-Magnesium Initiator (SBMG)

To each of two 10-ounce crown-capped beverage bottles was charged 1 gram of 50-mesh magnesium shavings (41 mM), followed by 30 ml. of THF and 10 ml. styrene (86.5 mM in THF). To one of the bottles (#1), 38.4 grams of 23.6% 1,3-butadiene in hexane (167 mM) were charged. To the other bottle (#2), 43.5 grams of 23.6% 1,3-butadiene in hexane (140 mM) were charged. Bottle #1 was placed in an ultrasound bath to activate the magnesium metal. Bottle #2 was placed in a 65° C. water bath. After three days at 65° C., most, but not all, of the magnesium in bottle #1 had reacted. The reaction in bottle #2 took longer and some magnesium was still present after seven days at 65° C.

From bottle #1, the THF was removed by evaporation. The SBMG in bottle #1 was dissolved by adding 80 ml. of styrene and 20 ml. of hexane. Titration of the SBMG in bottle #1 showed a magnesium concentration of 0.40 molar. This SBMG was subsequently used for polymerization in Example 2.

POLYMER PREPARATION

The following examples illustrate the process of the invention for the preparation of macrocyclic polymers from cyclic organomagnesium initiators. However, the examples are not intended to be limiting, as other methods for preparing these macrocyclic polymers from cyclic organometallic initiators according to the invention may be determined by those skilled in the art.

Each of the following polymers was prepared in a purged, oxygen-free one gallon stainless steel reactor. The monomers and solvents had been dried to approximately 5 parts per million (ppm) of water.

EXAMPLE 1

Six polymers, two at each of three different reactant concentrations indicated below, were prepared using the cyclic organomagnesium initiator, IMG, according to the following general method:

To the reactor was charged 3.5 lbs. of 23.7% 1,3-butadiene in technical hexane and diluted with 1.5 lbs. of additional hexane. While stirring, 0.5 mM of n-butyllithium in technical hexane and 6.0 mM of lithium-t-butoxide in cyclohexane were charged to the reactor at 25° C. After 15 minutes, 4.0 mM of IMG (0.46 molar in THF) and an additional 10 ml of THF were charged to the reactor. The reactor was then heated to 65°–70° C. and the reaction allowed to proceed for 2 hours. A sample taken at this time showed 90% conversion of the monomers to polymer.

Twenty percent of the resultant viscous polymer solution was then removed from the reactor and the reaction was terminated by dropping the polymer (uncoupled) into an equal volume of isopropanol containing one gram BHT (80 grams of BHT in 700 ml. hexane). The BHT solution served as an antioxidant.

To the remaining polymer solution in the reactor was charged 4.0 mM of the coupling agent, dimethyl silicon dichloride, and the reaction was allowed to proceed for one hour. The polymer cement (coupled polymer) was then isolated by coagulation in isopropanol containing BHT. Both the coupled polymer and the isopropanol-terminated, uncoupled polymer were then drum dried.

Two further isopropanol-terminated polymers were prepared in the same manner as the uncoupled polymer described above, except that 3.5 mM IMG and 3.0mM IMG, respectively, were employed.

Two further coupled polymers were prepared in the same manner as the coupled polymer described above, except that one of these polymers was prepared with 3.5 mM IMG and coupled with 3.5 mM dimethyl silicon dichloride; whereas the second polymer was prepared with 3.0 mM IMG and coupled with 3.0 mM of dimethyl silicon dichloride. As is expected for anionic polymerization, the molecular weight of the polybutadiene increased as the amount of IMG decreased.

EXAMPLE 2

A styrene-butadiene-styrene block polymer was prepared using the cyclic organomagnesium initiator, SBMG, as follows: To the reactor was charged 1.25 lbs. of 24.8% 1,3-butadiene in technical hexane and 3.1 lbs. of additional hexane, followed by 3.8 mM SBMG in styrene/hexane and 5.7 mM of lithium-t-butoxide in cyclohexane. The reactor was then heated to 60° C. and the reaction allowed to proceed for 4 hours. Then 180 grams of 33% styrene in hexane were added and polymerization proceeded for an additional hour. The coupling/functionalizing agent, 3.0 mM of dibutyl-tin-dichloride, was then added to the reactor. After one hour, the resulting polymer cement was isolated by coagulation in an equal volume of isopropanol containing BHT.

The polymer was then separated into two parts. One part was additionally treated with a slight excess of reagent grade (35%) hydrochloric acid. The two parts of the polymer were then isolated by precipitation after the addition of BHT and drum-dried.

POLYMER EVALUATIONS

The refractive index of each of the six polymers of Example 1 was measured and showed that each polymer had approximately 50% vinyl content. The number average molecular weight ($M_n$) and weight average molecular weight ($M_w$) were determined by gel permeation chromatography (GPC). Each of the six polymers was then compounded in a standard test formulation shown in Table I and cured for 30 minutes at 160° C. All of the compound mixes were prepared in a small Brabender mixer. The viscous modulus M" (at 50° C. and 1 Hz) of each of the six cured stocks was obtained. Prior to curing, compound Mooney values (ML-4 @ 100° C.), another indicator of viscosity, were also obtained.

TABLE I

| Compounding Test Formulation | |
|---|---|
| COMPONENT | PARTS BY WEIGHT |
| Polymer | 100 |
| Carbon Black (N-351) | 55 |
| Naphthenic Oil | 10 |
| Zinc Oxide | 3 |
| Antioxidant | 1 |
| Wax | 2 |
| Stearic Acid | 2 |
| Sulfur | 1.5 |
| Accelerator | 1 |

To determine if macrocyclic polymers were formed by the process described above, a graphical comparison of the average number molecular weight ($M_n$) versus the viscous modulus (M") of each of the coupled and non-coupled polybutadiene polymers was made and the results are illustrated in FIG. 4. The results show that the coupled polymers have a lower modulus of viscosity than the corresponding uncoupled linear polymers at both high and low molecular weights, indicating that these polymers have fewer end groups than the uncoupled polymers. These results are a clear indication that at least a portion of the coupled polymers consists of macrocyclic polymers.

Further, as illustrated in FIG. 5, a comparison of uncured Compound Mooney (ML-4 @ 100° C.) versus weight average molecular weight, $M_w$, shows that the macrocyclic polymers have a lower viscosity than the linear polymers at equivalent molecular weights.

EXAMPLE 2

Figure 6:
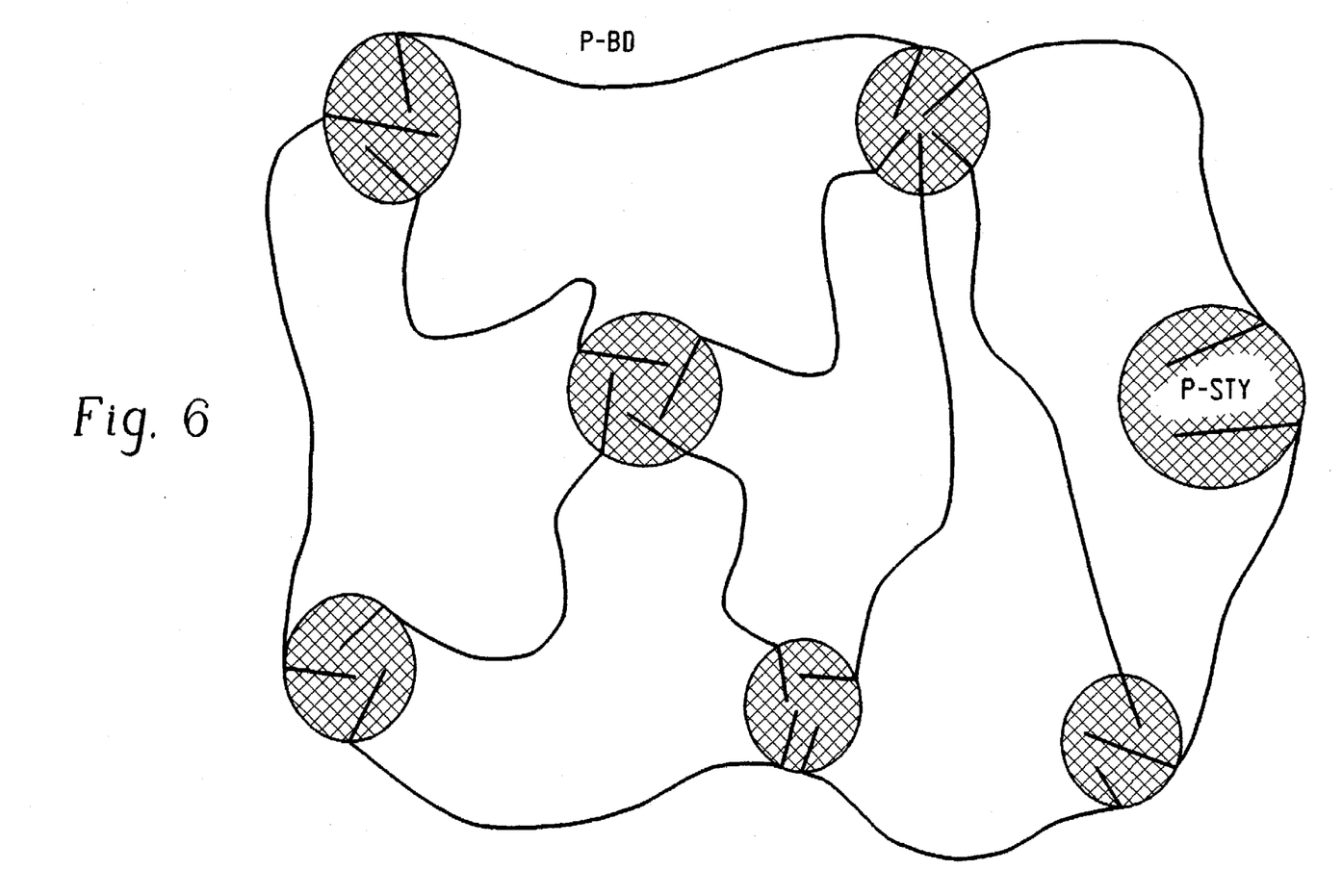
FIG. 6 is a schematic illustration of a theoretical styrene-butadiene-styrene (S-B-S) triblock polymer produced by the process of the invention, before treatment with a coupling agent, where P-STY and P-BD represent polystyrene and polybutadiene, respectively.

Theory predicts that the polymer produced from the cyclic organomagnesium initiator by the method of this example, before addition of the coupling agent, is a styrene-butadiene-styrene (S-B-S) triblock polymer with polystyrene segments (P-STY) and polybutadiene segments (P-BD). Such a polymer is illustrated in FIG. 6. Treatment of this polymer with a coupling agent, such as dibutyl-tin-dichloride would result in a cyclic polymer which, in effect, has a styrene-butadiene (S-B) structure, wherein the isolated macrocyclic polymers each have a single polystyrene segment. Such a tin-coupled macrocyclic polymer is schematically illustrated in FIG. 7.

Figure 7:
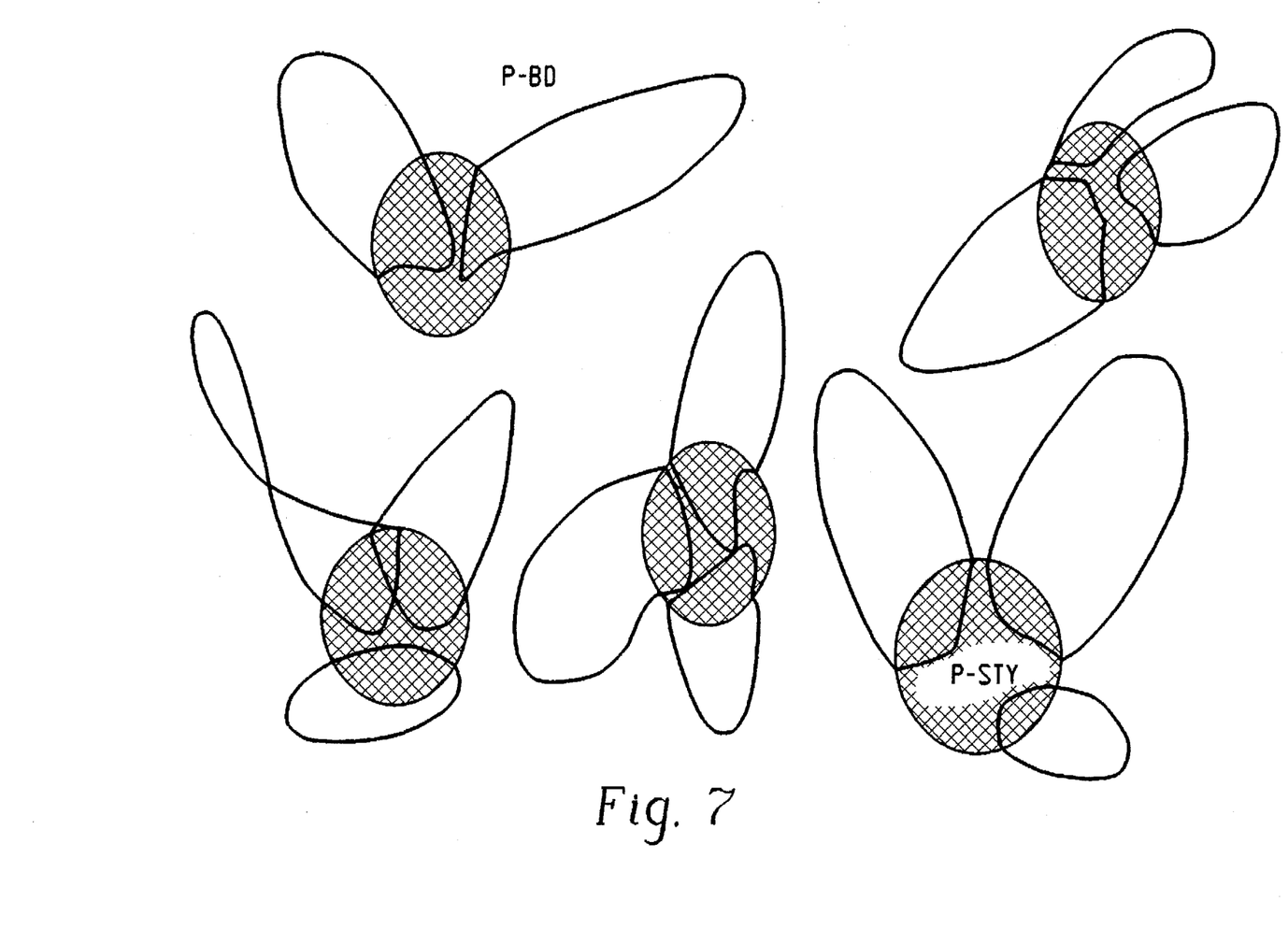
FIG. 7 is a schematic illustration of a theoretical styrene-butadiene (S-B) structure formed by treatment of the theoretical S-B-S triblock polymer of FIG. 6 with a coupling agent, where P-STY and P-BD represent polystyrene and polybutadiene, respectively.

Treatment of the macrocyclic polymer of FIG. 7 with hydrochloric acid would result in the breaking of the carbon-tin bonds in the middle of the polystyrene block. The styrene polymer ends would thus be freed to move into separate domains and to form the classic S-B-S triblock domain structure of FIG. 6.

To determine if such a macrocyclic S-B-S triblock polymer was prepared by the method of this example, the peak molecular weights of both the HCl-treated and untreated polymer were determined by GPC analysis. Theory predicts that the apparent peak molecular weight (the molecular weight at the peak of the molecular weight curve) of the HCl-treated polymer should be greater than that of the untreated polymer. The results supported the theory. The HCl-treated polymer had an apparent peak molecular weight of 124,100 and the untreated polymer had an apparent peak molecular weight of 110,800.

Theory predicts that the tensile strength of the HCl-treated (triblock S-B-S) polymer should be greater than that of the untreated, coupled (S-B) polymer. To test this theory, each polymer was pressed at 200° C. into a flat 0.40 inch sheet, microdumbbels were cut from each sample, and the tensile strength of each was measured by standard methods. It was found that the untreated polymer was very weak and exhibited a tensile strength of $T_b=30$ psi @ $E_b=25\%$, where $T_b$ equals tensile strength at break and $E_b$ equals elongation at break. The HCl-treated polymer had a tensile strength of $Tb=330$ psi @ $E_b=374\%$, or more than ten times the tensile strength of the untreated polymer. Thus, the results of both the molecular weight and tensile strength testing of the HCl-treated and untreated polymers show that the method of Example 2 produced a macrocyclic S-B copolymer.

It is clear from the foregoing examples and specification disclosure that the process of the present invention is capable of producing significant quantities of macrocyclic polymers by utilizing Group IIA and IIB cyclic organometallic compounds as initiators of anionic polymerization of polar and/or non-polar monomers. Further, the products of the polymerization exhibit lower viscosities than linear polymers at equivalent molecular weights and thus provide for enhanced polymer processability during molding, extruding and the forming of films. Moreover, the macrocyclic polymers synthesized by the process of the invention may be used to form vulcanizable elastomeric compounds and articles that exhibit reduced hysteresis properties.

The invention is not limited to the specific reactants, Group IIA and IIB cyclic organometallic initiators and Group IA metal organic compounds disclosed, nor to any particular polar or non-polar monomers, polar coordinators, solvents or other modifiers. Similarly, the examples have been provided merely to demonstrate the practice of the subject invention and do not constitute limitations of the invention. Those skilled in the art may readily select other monomers and process conditions, according to the disclosure made herein above. Thus, it is believed that any of the variables disclosed herein can readily be determined and controlled without departing from the scope of the invention herein disclosed and described. Moreover, the scope of the invention shall include all modifications and variations that fall within the scope of the attached claims.

I claim:

1. A process for preparing a macrocyclic polymer from at least one anionically polymerizable monomer, comprising reacting the monomer with an initiator which comprises a cyclic organometallic compound and terminating the reaction with a coupling agent, wherein the cyclic organometallic compound comprises a divalent metal atom (Mt) and a reactant (Rct) contained in a ring of the formula where m and n each independently represent at least one.

2. The process of claim 1, wherein the metal atom, Mt, is selected from the group consisting of beryllium, calcium, barium, strontium, magnesium, cadmium, zinc and mercury.

3. The process of claim 1, wherein the reactant, Rct, is selected from the group consisting of $C_2-C_{12}$ alkenes, $C_8-C_{28}$ alkylenes, $C_4-C_{40}$ conjugated alkadienes, polynuclear aromatics, dihaloorganic compounds, and mixtures thereof, and wherein m and n are each independently one to 6 and the total number of ring atoms is 5 to about 50 atoms.

4. The process of claim 1, wherein the initiator comprises a cyclic organomagnesium compound.

5. The process of claim 1, wherein the anionically polymerizable monomer comprises a polar monomer.

6. The process of claim 5, wherein the polar monomer is selected from the group consisting of alkyl methacrylates having from about 5 to about 25 carbon atoms, acrylonitriles, $C_2-C_8$ alkylene oxides, lactams, cyclosiloxanes, alkyl acrylates having from about 4 to about 25 carbon atoms, vinyl pyridine, and mixtures and copolymers thereof.

7. The process of claim 1, wherein the anionically polymerizable monomer comprises a non-polar monomer.

8. The process of claim 7, wherein the reaction is carried out in the presence of an activator selected from the group consisting of a metallic organic compound comprising a metal selected from the group consisting of lithium, sodium, potassium, rubidium, cesium and mixtures thereof; a polar solvent; a polar coordinator; and mixtures thereof.

9. The process of claim 7, wherein the non-polar monomer is selected from the group consisting of ethylene, conjugated alkadiene monomers having from about 4 to about 40 carbon atoms, aryl alkene monomers having from about 8 to about 20 carbon atoms, vinyl polynuclear aromatics, $C_6-C_{18}$ trienes, and mixtures thereof.

10. The process of claim 1, wherein the reaction is carried out in the presence of an anhydrous, aprotic solvent.

11. The process of claim 1, wherein the coupling agent is selected from the group consisting of substituted aldimines, substituted ketimines, 4,4'-bis(dimethylamino) benzophenone, 1,3-dimethyl-2-imidazolidinone, 1-alkyl substituted pyrrolidinones, 1-aryl substituted pyrrolidinones, tin tetrachloride, di($C_1-C_8$ alkyl) tin dichloride, carbon dioxide, ortho-dichloro-xylene, esters, diesters, triesters, dihalo organics, dimethylamino benzaldehyde, di($C_1-C_8$ alkyl) silicon dichloride, silicon tetrachloride, $C_1-C_8$ alkyl benzoate, hexachloroxylene, and mixtures thereof.

12. The process of claim 1, wherein the coupling agent comprises a functionalizing agent and the macrocyclic polymer comprises a functional group derived from the functionalizing agent after coupling.

13. The process of claim 1, wherein n and m are each independently 1 to 6 and the total number of ring atom members is 5 to about 50.

14. The process of claim 13, wherein the metal atom, Mt, is magnesium, the reactant, Rct, is selected from butadiene, isoprene, styrene and mixtures of these, n is 1 to 3, m is 1 to 6 and the monomer is a non-polar monomer selected from the group consisting of $C_2-C_{12}$ alkenes, $C_4-C_{12}$ conjugated alkadienes, $C_8-C_{20}$ aryl alkenes, and mixtures thereof.

* * * * *